Figure 1:
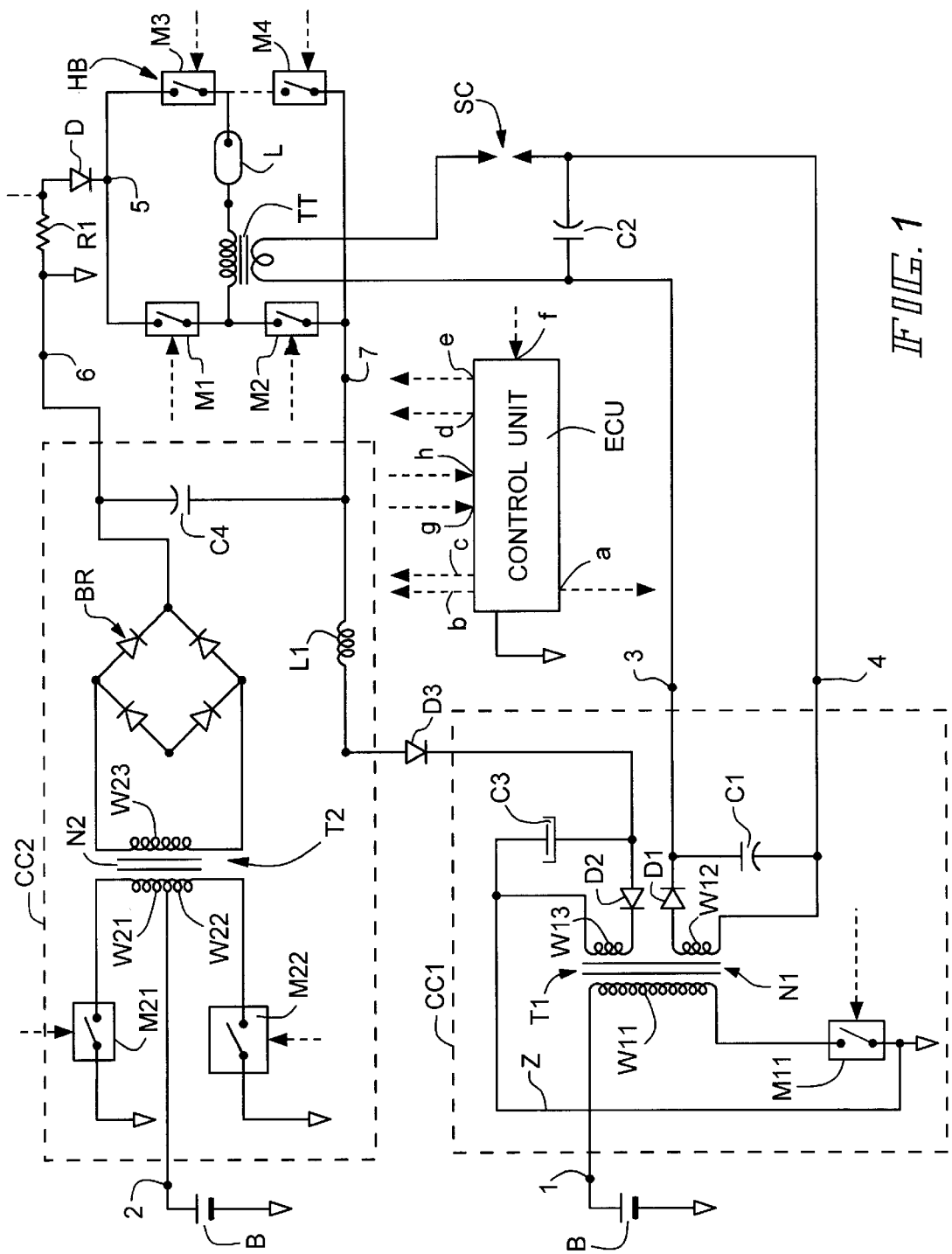

United States Patent [19]

Nepote et al.

[11] Patent Number: 6,140,770
[45] Date of Patent: Oct. 31, 2000

[54] BALLAST FOR A GAS-DISCHARGE LAMP, PARTICULARLY FOR MOTOR VEHICLES

[75] Inventors: Andrea Nepote, Turin; Dario Decurti, Settimo Torinese, both of Italy

[73] Assignee: Marelli Autornica S.p.A., Italy

[21] Appl. No.: 08/308,985

[22] Filed: Sep. 20, 1994

[30] Foreign Application Priority Data

Sep. 30, 1993 [IT] Italy ................................. TO93A0714

[51] Int. Cl.⁷ ................................................. H05B 37/02
[52] U.S. Cl. ............................ 315/82; 315/307; 315/224; 315/DIG. 5; 315/DIG. 7
[58] Field of Search ............................ 315/205, 82, 291, 315/308, 307, DIG. 5, DIG. 7, 219, 224

[56] References Cited

U.S. PATENT DOCUMENTS

| 4,469,981 | 9/1984 | Ruff et al. ................................ | 315/205 |
| 4,709,188 | 11/1987 | Roberts .................................... | 315/205 |
| 5,151,631 | 9/1992 | Oda et al. ................................. | 315/82 |

FOREIGN PATENT DOCUMENTS

| 0 294 901 | 12/1988 | European Pat. Off. . |
| 0 411 617 | 2/1991 | European Pat. Off. . |
| 2 489 069 | 8/1981 | France . |
| WO-A-91 20174 | 12/1991 | WIPO . |

*Primary Examiner*—Michael B Shingleton
*Attorney, Agent, or Firm*—Cook, Alex, McFarron, Manzo, Cummings & Mehler, Ltd.

[57] ABSTRACT

The circuit comprises a switched dc/dc converter of the "fly-back" type, a second switched dc/dc converter of the "feed-forward" type, an H-shaped bridge switching circuit which is connected to the dc/dc converters and in the central branch of which the discharge lamp and an associated reactive starter device are disposed, and a control circuit which can drive the dc/dc converters and the bridge switching circuit in a manner such that, each time the lamp is switched on, a very high voltage is applied initially, in particular, in order to start the lamp, and subsequently a low voltage is applied, but with a high electrical power, in order to support the passage of a large current through the lamp during the heating (warming-up) of the lamp and during the subsequent steady operation of the lamp.

13 Claims, 4 Drawing Sheets

BALLAST FOR A GAS-DISCHARGE LAMP, PARTICULARLY FOR MOTOR VEHICLES

DESCRIPTION

The present invention relates to a ballast for a gas-discharge lamp, particularly for use in motor vehicles.

More specifically, the subject of the invention is a ballast for a gas-discharge lamp comprising:

switched dc/dc converter means which are intended to be connected to a direct-current voltage source such as the battery of a motor vehicle and which can output a direct-current voltage higher than that supplied by the source, an H-shaped bridge switching circuit which is connected to the dc/dc converter means and in the central branch of which the discharge lamp and associated reactive starter means are disposed, and control circuitry for driving the dc/dc converter means and the bridge switching circuit in a manner such that, each time the lamp is switched on, a very high voltage is applied initially, in particular, in order to start the current flow, and subsequently a low voltage is applied, but with a high electrical power, in order to support the passage of a large current through the lamp during the heating (warming-up) of the lamp and during the subsequent steady operation of the lamp.

In order to drive a gas-discharge lamp correctly during a switching-on stage, a very high voltage of the order, for example, of 20 Kv must be applied thereto initially in order to start the lamp. At this stage, which is of very short duration (of the order of a few tens of nanoseconds), the current through the lamp is substantially zero.

The starting stage is followed by a stage normally called the "take-over" stage in which a fairly high voltage, for example, of the order of 200–500 V nevertheless has to be applied to the lamp. This stage has a duration of the order of 0.1 milliseconds.

There then follows a stage of a few seconds' duration in which the lamp is heated (warmed up), during which a low voltage (for example between 20 and 100 V) is applied to the lamp, whilst a current of high intensity (for example between 0.4 and 2.6 A) is made to flow through the lamp.

During the subsequent steady operation, the voltage applied to the lamp is still of the order of several tens of volts and the current also remains large, for example, between 0.3 and 0.5 A.

Ballasts for gas-discharge lamps used in motor vehicles should conveniently have small dimensions.

In some known ballasts a switched dc/dc converter, for example, of the so-called "fly-back" type is used and comprises a transformer, downstream of which a rectifier circuit and an output capacitor are connected. The primary winding of the transformer is connected in switched mode to a direct-current voltage source, by means of one or more electronic switches.

The use of a "fly-back" dc/dc converter enables very high voltages to be achieved for the starting and take-over stages, irrespective of the turns ratio of the transformer used. The core of the transformer is physically quite bulky, however, since its dimensions depend (almost quadratically) on the intensity of the current to be supplied to the lamp. The dimensions of the core must therefore be based upon the large current which has to be supplied to the lamp during the relatively short warm-up stage and the core is inevitably over-sized in relation to the current to be supplied to the lamp during steady operation.

There are other known ballasts for gas-discharge lamps, in which a switched dc/dc converter of the so-called "feed-forward" type, for example of the push-pull type, is used. This type of converter comprises a transformer, the primary winding of which can be connected to a direct-current voltage source by means of electronic switches driven in on-off mode, a rectifier circuit connected to the secondary winding of this transformer, and a filtering output circuit, usually of the LC type.

Whereas in "fly-back" converters the transfer of energy from the primary side to the secondary side of the transformer takes place when the switch or switches associated with the primary winding of the transformer are opened, in "feed-forward" converters, the energy transfer takes place when the switches are closed.

With the use of a "feed-forward" converter, the dimensions of the transformer core need not depend on the intensity of the current to be supplied to the lamp. In order to make available the very high voltage necessary at the stage at which current starts to flow through the lamp, the transformer of the converter therefore has to have a very high ratio of turns. The windings of the transformer correspondingly have considerable dimensions. Moreover, the switches of the converter have to be piloted by signals with a very low duty-cycle.

For the reasons set out above, the ballasts for gas-discharge lamps described above are thus of notable size.

An object of the present invention is to provide a ballast for a gas-discharge lamp which has smaller overall dimensions than circuits of the prior art.

This object is achieved, according to the invention, by a ballast, the main characteristics of which are defined in the appended claim 1.

Figure 2:
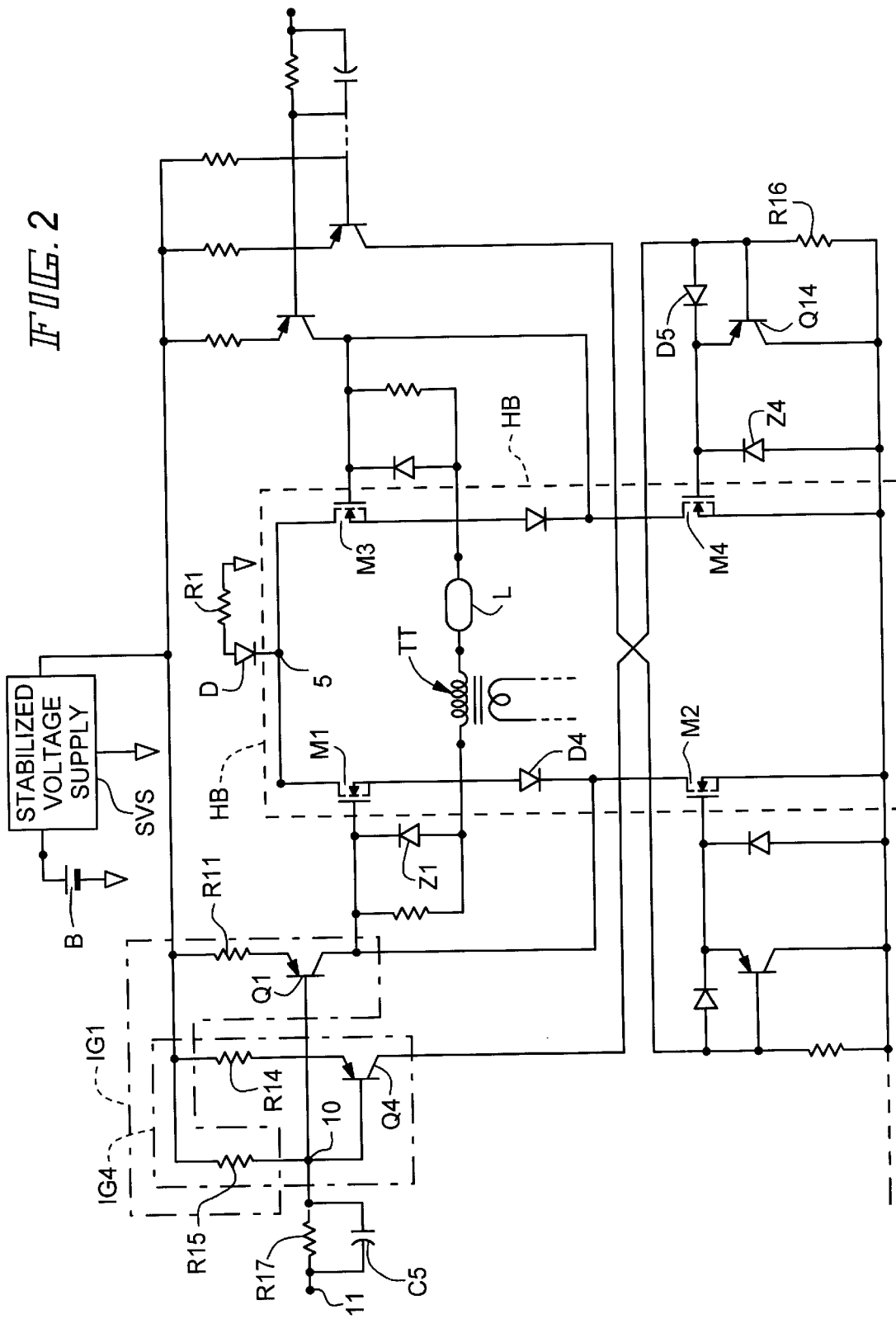
Figure 3:
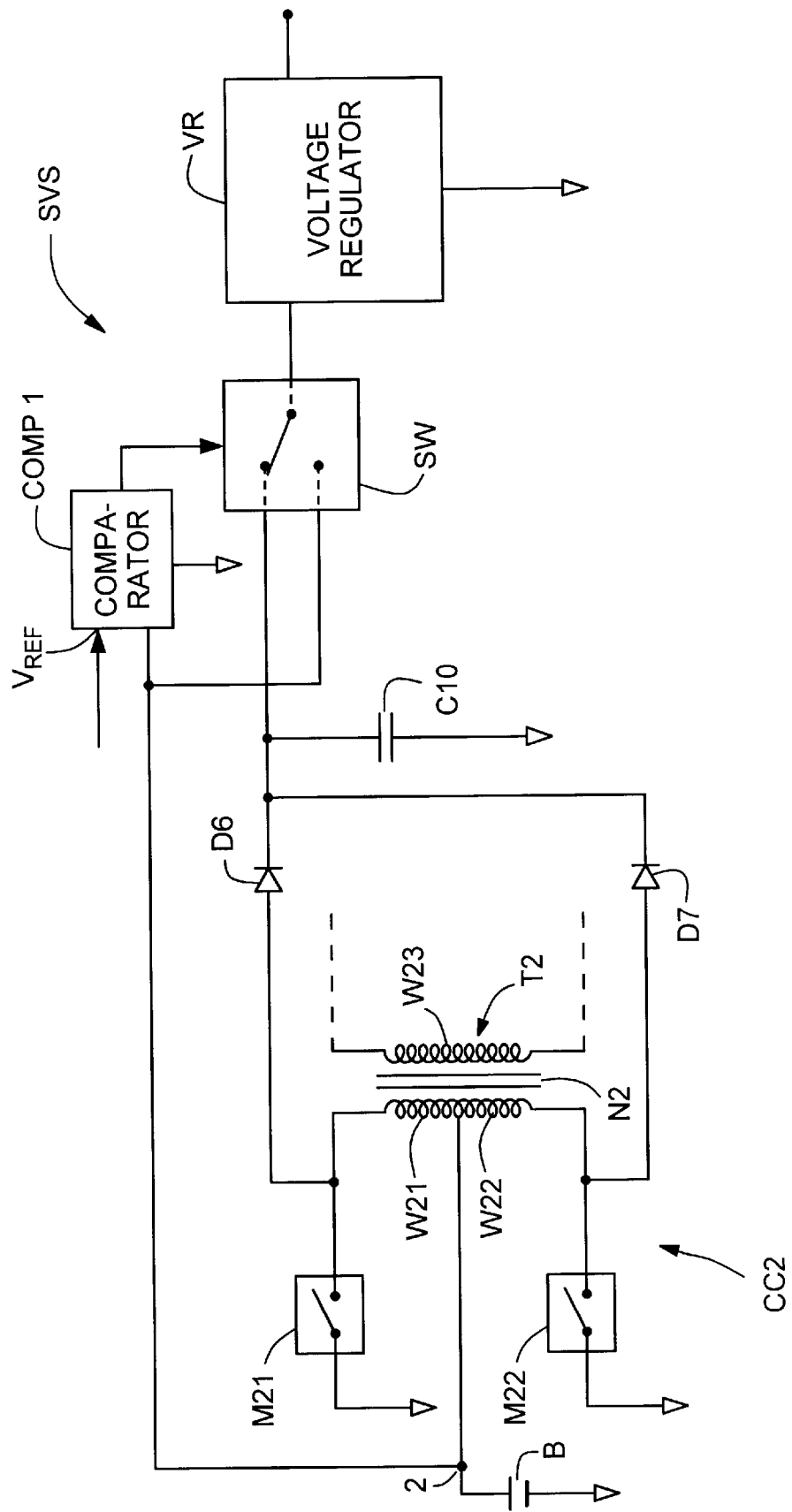
Figure 4:
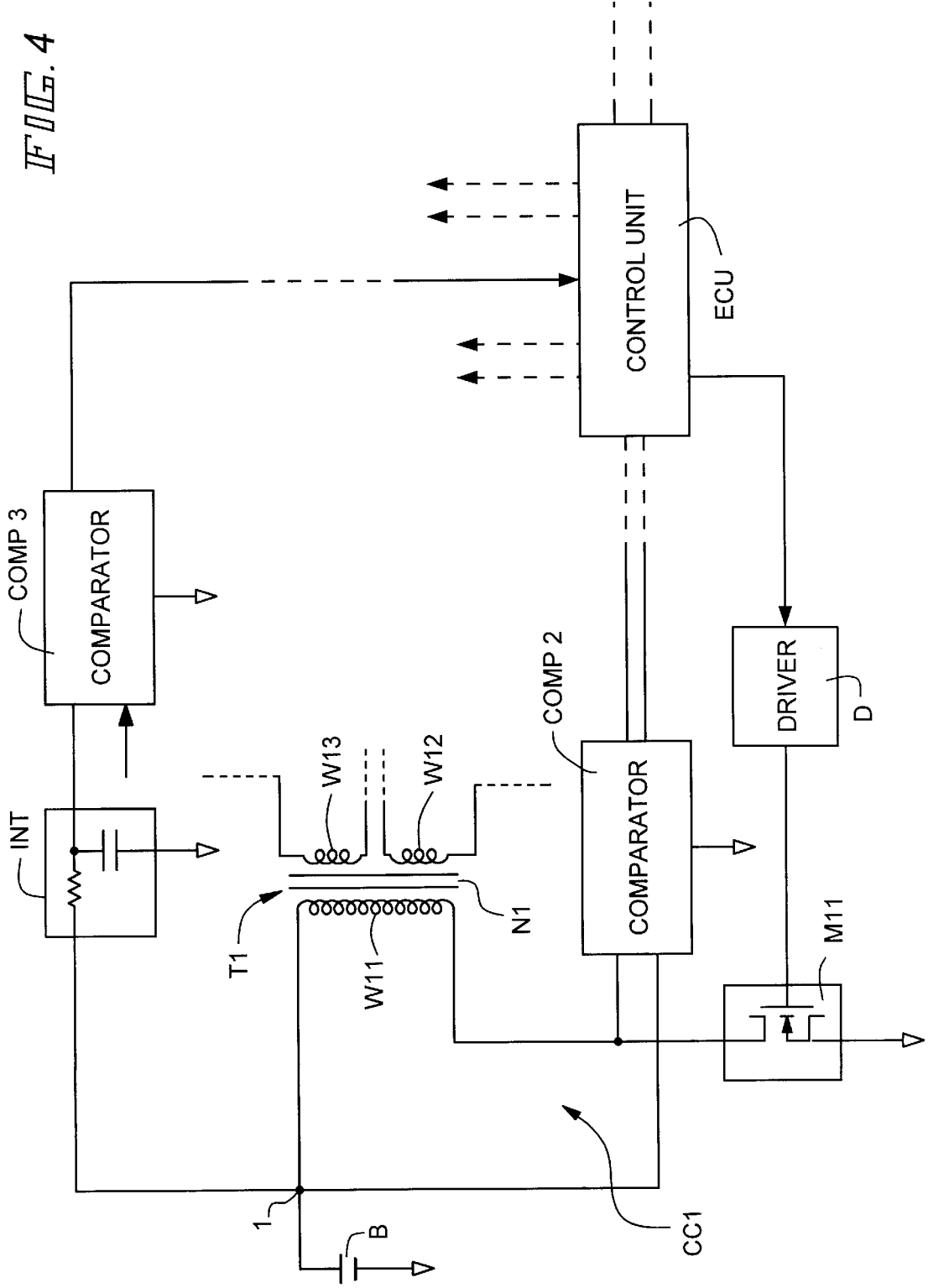

Further characteristics and advantages of the invention will become clear from the detailed description which follows, purely by way of non-limiting example, with reference to the appended drawings, in which:

FIG. 1 shows the layout of a ballast for a gas-discharge lamp according to the invention, FIG. 2 is the circuit diagram of an embodiment of the circuits for driving the bridge switching circuit included in the ballast according to the invention, FIG. 3 is a circuit diagram, partially in block form, of a stabilized supply used in the ballast according to the invention, and FIG. 4 is a diagram showing further circuits which can be used in the ballast according to the invention.

The ballast for a gas-discharge lamp shown in FIG. 1 comprises two switched dc/dc converters generally indicated CC1 and CC2, respectively.

The converter CC1 is of the "fly-back" type, whereas the converter CC2 is of the "feed-forward" type.

The converters have respective inputs 1 and 2 connected to a direct-current voltage source such as the battery B of a motor vehicle.

The output of the converter CC2 is connected to an H-shaped bridge switching circuit, generally indicated HB, comprising four switches M1 to M4 which, conveniently, are constituted by MOSFET transistors.

The gas-discharge lamp L and the secondary winding of a pulse transformer (a Tesla transformer) TT are disposed in the central branch of the bridge switching circuit HB. The primary winding of this transformer is connected, by means of a discharger SC, to two output terminals 3 and 4 of the converter CC1.

The top junction 5 of the bridge switching circuit HB is connected to earth by means of a protective diode D and a resistor R1 which acts as a current sensor.

In the embodiment illustrated, the converter CC1 comprises a transformer T1 with a core N1, a primary winding W11 disposed between the input 1 and earth and in series with a switch M11, a first secondary winding W12 connected by means of a rectifier diode D1 to two capacitors C1 and C2 which are in parallel with each other, and a second secondary winding W13 connected to a capacitor C3 by means of a rectifier diode D2.

The capacitors C1 and C2 are connected in parallel between the output terminals 3 and 4 of the converter CC1. One plate of the capacitor C3 is connected to earth and the other plate is connected to the anode 2 of the diode D2.

The converter CC2 comprises a transformer T2 with a core N2, a primary winding divided into two half-windings W21 and W22, the junction of which is connected to the input terminal 2, and a secondary winding W23. A respective electronic switch M21, M22 is interposed between each primary half-winding W21, W22 and earth. The secondary winding W23 is connected to a full-wave rectifier circuit BR which, in the embodiment shown in FIG. 1, is of the diode-bridge type. An LC filter comprising an inductor L1 and a capacitor C4 in parallel between the output terminals 6 and 7 of the converter CC2 is connected to the output of the rectifier circuit.

The terminal of the inductor L1 which is connected to the rectifier bridge BR is also connected to the anode of a diode D3, the cathode of which is connected to the junction between the capacitor C3 and the anode of the diode D2 of the converter CC1.

The electronic switches M11, M21 and M22 of the converters CC1 and CC2 may conveniently also be constituted by MOSFET transistors.

An electronic control unit, indicated ECU, has a plurality of inputs and outputs connected to the two converter circuits as well as to the bridge circuit HB.

In particular, an output a of the unit ECU is connected to the control input of the switch M11. Two further outputs b, c of this unit are connected to the control inputs of the switches M21 and M22. Another two outputs d, e are connected, respectively, to the control inputs of the pairs of switches M1, M4, and M2, M3 of the bridge circuit HB.

The unit ECU also has an input f which is connected to the non-earthed terminal of the resistor R1 in order to receive at that input a voltage signal indicative of the intensity of the current flowing in the bridge circuit and hence in the lamp L, in operation. Two further inputs g and h of the unit ECU are connected to the terminals 6 and 7 of the converter circuit CC2 in order to receive a signal indicative of the voltage applied to the lamp L in operation.

The unit ECU, which may be formed with the use of a microprocessor, is arranged to drive the convertors CC1 and CC2 and the switches of the bridge circuit HB so as to control the switching-on of the gas-discharge lamp L in the following manner.

In order to switch on the lamp L, the unit ECU sends an on-off driving signal to the switch M11 of the converter CC1, which is of the "fly-back" type. The secondary windings W12 and W13 of the transformer of this converter conveniently have different numbers of turns so that the driving of the switch M11 causes the capacitors C2 (+C1) and C3 to be charged to different respective voltages. In particular, the capacitor C2 (+C1) is charged to a voltage of the order of a few kvolts, corresponding to the starting voltage of the discharger SC associated with the lamp L. The capacitor C3 is charged to a voltage of the order of a few hundred volts (for example 300 V), which corresponds to the "take-over" voltage.

During the charging of the output capacitors of the converter CC1, the bridge circuit HB is kept switching, or, preferably, is kept in a predetermined condition in which two of its switches (for example, M1 and M4) are closed, whilst the other two (M2 and M3) are open, waiting for the conduction of current through the lamp L to start.

When the voltage in the capacitor C2 reaches the starting voltage, this capacitor is discharged through the primary winding of the transformer TT and the discharger SC. An over-voltage is correspondingly transferred to the secondary winding of the transformer TT ionizing the gas contained in the lamp L which therefore becomes conductive.

A conductive path including the conductive switches and the central branch (including the lamp L) of the bridge circuit HB, the inductor L1, the capacitor C3 and the conductive connection z between this capacitor and earth is thus created, enabling the capacitor C3 of the converter CC1 to be discharged. At this stage, the "take-over" voltage (for example about 300V) to which the capacitor C3 was previously charged, is applied to the lamp.

Upon completion of this stage, the unit ECU de-activates the converter CC1, keeping the switch M11 permanently open. The unit ECU then controls the switches M21 and M22 of the converter CC2, as well as the pairs of switches M1, M4 and M2, M3 of the bridge circuit HB, in push-pull mode so that the voltage applied to the lamp L and the current flowing through it correspond to the values envisaged for the "warm-up" stage and steady operation ("steady-state").

The ballast described above with reference to FIG. 1 can be formed so as to be notably compact. In fact, although it contains two dc/dc converter circuits, the dimensions of the converters are not critical and their overall dimensions can be considerably smaller than the dimensions of a single dc/dc converter typically used in circuits according to the prior art.

In fact the "fly-back" converter CC1 enables very high voltages to be achieved for the starting and "take-over" stages with a transformer having low turns-ratio values. The core of the transformer can be very small since the transformer does not operate during the subsequent "warm-up" and "steady-state" stages in which a current of quite high intensity has to be supplied to the lamp L.

The transformer T2 of the "feed-forward" converter CC2 can have a relatively small turns ratio since this transformer is not intended to generate the very high voltages required in the starting and "take-over" stages. The dimensions of the core of this transformer, on the other hand, are not dependent on the intensity of the current to be supplied to the lamp during the subsequent "warm-up" and "steady-state" stages.

It should be noted that, in operation, during the initial stages (starting and "take-over"), whilst the unit ECU is driving the convertor CC1 so as to charge the capacitors C2 and C3 to the necessary voltages, this unit is also driving the converter CC2 in order to charge the capacity of the capacitor C4 so that the converter CC2 is ready to take over from the converter CC1 for the "warm-up" stage of the lamp L.

The output filter of the converter CC2, formed by the inductor L1 and the capacitor C4, also acts as a current-limiter and as a restarting over-voltage generator when the bridge circuit HB reverses the direction of the current flowing through the lamp L.

The bridge circuit HB of FIG. 1 operates substantially between a potential (terminal 5) which corresponds substantially to that of the earth, and a potential (terminal 7) which is very much more negative than the earth.

The MOSFET transistors M1 to M4 of this bridge circuit may be driven, for example, with the use of the driver circuits which will now be described with reference to FIG. 2.

As this drawing shows, the driver circuits for the transistors M1, M4 are identical and symmetrical to those used for driving the pair of transistors M2, M3. Only the circuits used for driving M1 and M4 will therefore now be described in detail.

As can be seen in FIG. 2, respective protective zener diodes Z1 and Z4 are connected between the gates and the sources of M1 and M4.

The inputs of two current-generator circuits, indicated IG1 and IG4 are connected to each other at 10 and their respective outputs are connected to the gates of M1 and M4.

In the embodiment shown, the current generator IG1 comprises a pnp transistor Q1 the base of which is connected to the junction 10, the collector is connected to the gate of M1 and to the cathode of a diode D4 interposed between M1 and M2 (the functions of which will be described below), and the emitter is connected, by means of a resistor R11, to the output of a stabilized supply SVS which outputs a stabilized direct-current voltage of, for example, +12V.

Similarly, the current generator IG4 comprises a bipolar transistor Q4, the base of which is connected to the junction 10, the collector is connected to the gate of M4, by means of a diode D5, and the emitter is connected to the output of SVS, by means of a resistor R14.

A resistor R15 which is common to the two current generators is connected between the bases of Q1 and Q4 and the output of SVS.

A resistor R16 is connected between the collector of Q4 and the source of M4. The base of a pnp bipolar transistor Q14 is connected to the collector of Q4, its collector is connected to the source of M4, and its emitter is connected to the gate of M4.

A capacitor C5 is interposed between the junction 10 and an input terminal 11, and a resistor R17 is connected in parallel therewith.

The terminal 11 represents the control input for the driving of M1 and M4 and is connected to a corresponding output of the electronic control unit ECU.

When a "high"-level control pulse reaches the input terminal 11, the capacitor C5 is initially discharged. The control signal reaches the junction 10, and hence both of the current generators IG1 and IG4, which output high-intensity currents enabling rapid charging of the intrinsic input capacitances of M1 and M4 which thus become conductive.

Meanwhile, the capacitor C5 is charged, the currents generated by IG1 and IG4 reduce, and the dissipation in the transistors Q1 and Q4 is drastically limited.

The diode D4 has the function of preventing M1 from becoming conductive whilst M2 is conductive. In fact if M2 is conductive, current passes through the diode D4 and a voltage drop (for example of about 0.6 V) develops across it and is applied to the gate of M1, preventing the latter from becoming conductive.

FIG. 3 shows an embodiment of the stabilized supply SVS described above with reference to FIG. 2.

The stabilized supply of FIG. 3 provides a stabilized output supply voltage of, for example, +12V even when there are considerable variations in the voltage supplied by the battery B, which may vary, for example, between 8 and 15V.

In the embodiment shown in FIG. 3, the respective anodes of two rectifier diodes D6 and D7 are connected to the junction between the primary half-windings W21, W22 of the converter CC2 and the associated electronic switches M21, M22. The cathodes of the diodes D6, D7 are connected to one plate of a capacitor C10, the other plate of which is connected to earth.

As stated above, the converter CC2 is of the "feed-forward" type and operates in push-pull mode. If $V_b$ is the voltage supplied by the battery B, a voltage of about $2V_b$ is consequently localized in the capacitor C10, in operation.

The capacitor C10 can be connected by means of a switching device SW, to the input of a voltage regulator VR (of known type) which can supply the desired stabilized output supply voltage of, for example 12V.

A comparator circuit, indicated COMP1 has an input connected to the battery B, in order to compare the voltage $V_b$ supplied by the battery with a predetermined reference value $V_{REF}$ of about 12V.

The output of the comparator COMP1 controls the switching device SW in a manner such that the latter connects the capacitor C10 to the input of the voltage regulator VR only when the voltage $V_b$ supplied by the battery B is less than $V_{REF}$.

When the voltage $V_b$ is greater than $V_{REF}$, the switching device SW connects the input of the regulator VR to the battery B.

If the voltage $V_b$ supplied by the battery B is inadequate, the capacitor C10, in which a voltage approximately double that supplied by the battery is available, is thus connected to the input of the voltage regulator VR.

If, however, the voltage $V_b$ is adequate, the input of the voltage regulator VR is connected directly to the battery, thus reducing the amount of dissipation in the voltage-regulator in this situation.

In addition to the function described above, the capacitor C10 also conveniently carries out a "clamping" action, neutralizing the effect of the leakage inductance of the primary windings of the converter CC2.

Further circuits which may conveniently be associated with the "fly-back" converter CC1 will now be described with reference to FIG. 4.

This converter is of the self-pulsing type and in the operation it is desirable for current to flow through the primary winding W11 as soon as all the energy previously stored in this winding has been transferred to the secondary windings W12 and W13.

For this purpose, a comparator circuit COMP2 has an input connected to the battery B and another input connected to the drain of the MOSFET transistor M11 which controls the passage of current through the primary winding W11. The comparator COMP2 compares the drain voltage DM11 with the battery voltage $V_b$.

When the drain voltage of M11 is greater than $V_b$, the transfer of energy from the primary winding W11 to the secondary windings W12 and W13 is still in progress. As soon as the drain voltage of M11 becomes substantially equal to $V_b$, the transfer of energy from the primary winding W11 to the secondary windings W12 and W13 is complete and current can be passed through the primary winding again.

Correspondingly, the output of the comparator COMP2 is connected to a suitable input of the electronic control unit ECU which provides for M11 to be made conductive by means of the driver circuit D as soon as the output of the comparator COMP2 indicates that the drain voltage of M11 has become substantially equal to $V_b$.

The dimensions of the core N1 of the transformer T1 of the converter CC1 are selected in relation to a maximum intensity $I_{MAX}$ of the current in the primary winding W11. It is therefore necessary to limit the current in the primary winding W11 to this value. This can be achieved in conventional manner by placing a resistor in the output circuit of the transistor M11 to act as a current sensor.

If it is desired to avoid the use of this resistor, it is possible to use an integrator circuit, such as that indicated INT in FIG. 4, with its input connected to the battery B and its output to the input of a comparator circuit COMP3.

In operation, the integral of the voltage $V_b$ supplied by the battery is indicative of the intensity of the current flowing in the primary winding W11. The comparator COMP3 compares the integral of $V_b$ with a threshold corresponding to the predetermined maximum intensity for the current in the primary winding W11 and supplies corresponding information to the electronic control unit ECU which limits the current flowing in W11, when necessary, by driving M11 correspondingly.

The solution just described is extremely simple and cheap and is more immune to interferences than conventional solutions which provide for the use of a resistor to act as a current sensor.

As stated above, the electronic control unit ECU may conveniently be formed with the use of a microprocessor with associated RAM and ROM storage circuits.

According to a further characteristic, this electronic control unit may be arranged to remember which pair of switches of the bridge circuit HB was closed initially, and hence in which direction current flowed through the lamp L initially, each time the lamp is switched on. The next time the lamp is switched on, the unit ECU closes the other pair of switches so that, each time the lamp is switched on, the initial direction of the current through the lamp L is reversed in comparison with the previous occasion.

By virtue of this characteristic, on 50% of occasions the lamp is switched on with the current flowing in one direction and on 50% of occasions with the current flowing in the opposite direction, which avoids damage and thus prolongs the life of the electrode of the lamp which receives the flow of electrons during switching-on.

Naturally, the principle of the invention remaining the same, the forms of embodiment and details of construction may be varied widely with respect to those described and illustrated purely by way of non-limiting example, without thereby departing from the scope of the present invention as defined in the appended claims.

What is claimed is:

1. A ballast for a gas-discharge lamp, particularly for motor vehicles, comprising:
    switched dc/dc converter means which are intended to be connected to a direct-current voltage source such as the battery of a motor vehicle, and which can output a direct-current voltage higher than that supplied by the source,
    an H-shaped bridge switching circuit which is connected to the dc/dc converter means and in the central branch of which the discharge lamp and associated reactive starting means are disposed, and
    control circuitry for driving the dc/dc converter means and the bridge switching circuit in a manner such that, each time the lamp is switched on, a very high voltage is applied initially, in particular in order to start the lamp, and subsequently a low voltage is applied, but with a high electrical power, in order to support the passage of a large current through the lamp during the heating (warming-up) of the lamp and during the subsequent steady operation of the lamp;
    the dc/dc converter means comprising
    a switched dc/dc converter of the "fly-back" type and a second switched dc/dc converter of the "feed-forward" type,
    the control circuitry being arranged to drive the dc/dc converters in a manner such that, each time the lamp is switched on, first the "fly-back" converter is activated in order to generate the very high voltage and, subsequently, the "feed-forward" converter is activated in order to generate the low voltage with high electrical power.

2. A ballast according to claim 1, wherein the "feed-forward" converter comprises an LC output filter including an inductor, the "fly-back" converter comprising a transformer with a primary winding and first and second secondary windings, to which respective output capacitors are connected by means of respective rectifier means, the first and second secondary windings having respective numbers of turns such that the associated capacitors are charged to respective predetermined voltages substantially corresponding to the starting voltage and to the "take-over" voltage of the lamp, respectively, in operation.

3. A ballast according to claim 2, wherein the capacitor associated with the second secondary winding of the transformer of the "fly-back" converter is connected to the inductor of the filter by means of a diode in a manner such that a current path including the lamp and the capacitor is formed as soon as current has started to be conducted through the lamp.

4. A ballast according to claim 1, wherein the "feed-forward" converter is a "push-pull" converter.

5. A ballast according to claim 1, herein the control circuitry is arranged to store the initial direction in which current flows through the lamp each time the lamp is switched on, and to control the bridge switching circuit in a manner such that, on average, the lamp is switched on 50% of occasions with the current flowing in one direction and on 50% of occasions with the current flowing in the opposite direction.

6. A ballast according to claim 1, in which the bridge switching circuit comprises two pairs of MOSFET transistors which are intended to be made conductive and cut off alternately by means of respective driver circuits connected to the control circuitry, the bridge circuit operating at negative potentials with respect to the earth;
    each pair of MOSFET transistors of the bridge circuit being associated with a respective driver circuit comprising first and second current generators which are connected to a same stabilized voltage supply adapted to supply a direct-current supply voltage which is positive with respect to earth, the respective control inputs of the current generators being connected to each other and their respective outputs being connected to the gates of the associated MOSFET transistors.

7. A ballast according to claim 6, comprising regulation means which can limit the intensity of the current supplied by the current generators after the associated MOSFET transistors have become conductive.

8. A control circuit according to claim 6, wherein the bridge switching circuit comprises cut-off means which can prevent current from being conducted through the two pairs of MOSFET transistors simultaneously.

9. A ballast according to claim 6, wherein the stabilized voltage supply comprises:

a voltage regulator adapted to output a predetermined stabilized voltage lower than the non-stabilized voltage applied to its input, voltage raising means which are connected to the direct-current voltage source and are adapted to output a non-stabilized direct-current voltage proportional to and greater than the voltage supplied by the source, comparator means which are adapted to compare the voltage supplied by the source with a predetermined value and to connect the input of the voltage regulator to the source when the voltage of the source is greater than the predetermined value and to the output of the voltage-raising means when the voltage of the supply is less than the predetermined value.

10. A circuit according to claim 9, wherein the voltage raising means comprise rectifier means connected to the "feed-forward" converter and a capacitor connected to the rectifier means, the arrangement being such that the capacitor can be charged to a voltage approximately double the voltage generated by the source.

11. A ballast according to claim 1, in which the "fly-back" converter comprises a transformer with a primary winding in series with an electronic switch, the series which includes the primary winding and the electronic switch being connected to the said direct-current voltage source, comparator means being connected to the control circuitry for comparing the output voltage of the electronic switch with the voltage supplied by the source, the control circuitry being arranged to restart the flow of current through the primary winding and through the associated electronic switch as soon as the output voltage of the switch becomes substantially equal to the voltage supplied by the source when the "fly-back" converter is in operation.

12. A ballast according to claim 1, in which the "fly-back" converter comprises a transformer with a primary winding and means for limiting the current flowing in said primary winding, said current-limiting means comprising integrator circuitry adapted to supply a signal indicative of the integral of the voltage supplied by the said voltage source, and comparator means adapted to compare the signal supplied by the integrator circuitry with a predetermined reference corresponding to the envisaged maximum intensity of the current in the primary winding, the comparator means being connected to the control circuitry which is arranged to control the current flowing through the primary winding in a predetermined manner and in dependence on the signal supplied by the comparator means.

13. A ballast for a gas-discharge lamp, particularly for motor vehicles, comprising:

switched dc/dc converter means which are intended to be connected to a direct-current voltage source such as the battery of a motor vehicle, and which can output a direct-current voltage higher than that supplied by the source, an H-shaped bridge switching circuit which is connected to the dc/dc converter means and in the central branch of which the discharge lamp and associated reactive starting means are disposed, and control circuitry for driving the dc/dc converter means and the bridge switching circuit in a manner such that, each time the lamp is switched on, a very high voltage is applied initially, in particular in order to start the lamp, and subsequently a low voltage is applied, but with a high electrical power, in order to support the passage of a large current through the lamp during the heating (warming-up) of the lamp and during the subsequent steady operation of the lamp:

the dc/dc converter means comprising a switched dc/dc converter of the "fly-back" type and a second switched dc/dc converter of the "feed-forward" type, the control circuitry being arranged to drive the dc/dc converters in a manner such that, each time the lamp is switched on, first the "fly-back" converter is activated in order to generate the very high voltage and, subsequently, the "feed-forward" converter is activated in order to generate the low voltage with high electrical power wherein the "fly-back" converter comprises a transformer with a primary winding and means for limiting the current flowing in said primary winding, said current-limiting means comprising integrator circuitry adapted to supply a signal indicative of the integral of the voltage supplied by the said voltage source, and comparator means adapted to compare the signal supplied by the integrator circuitry with a predetermined reference corresponding to the envisaged maximum intensity of the current in the primary winding, the comparator means being connected to the control circuitry which is arranged to control the current flowing through the primary winding in a predetermined manner and in dependence on the signal supplied by the comparator means.

* * * * *